Nov. 19, 1963 F. GERRAND ETAL 3,111,578
UTILIZING PREDICTED PARITY
Filed Dec. 31, 1959
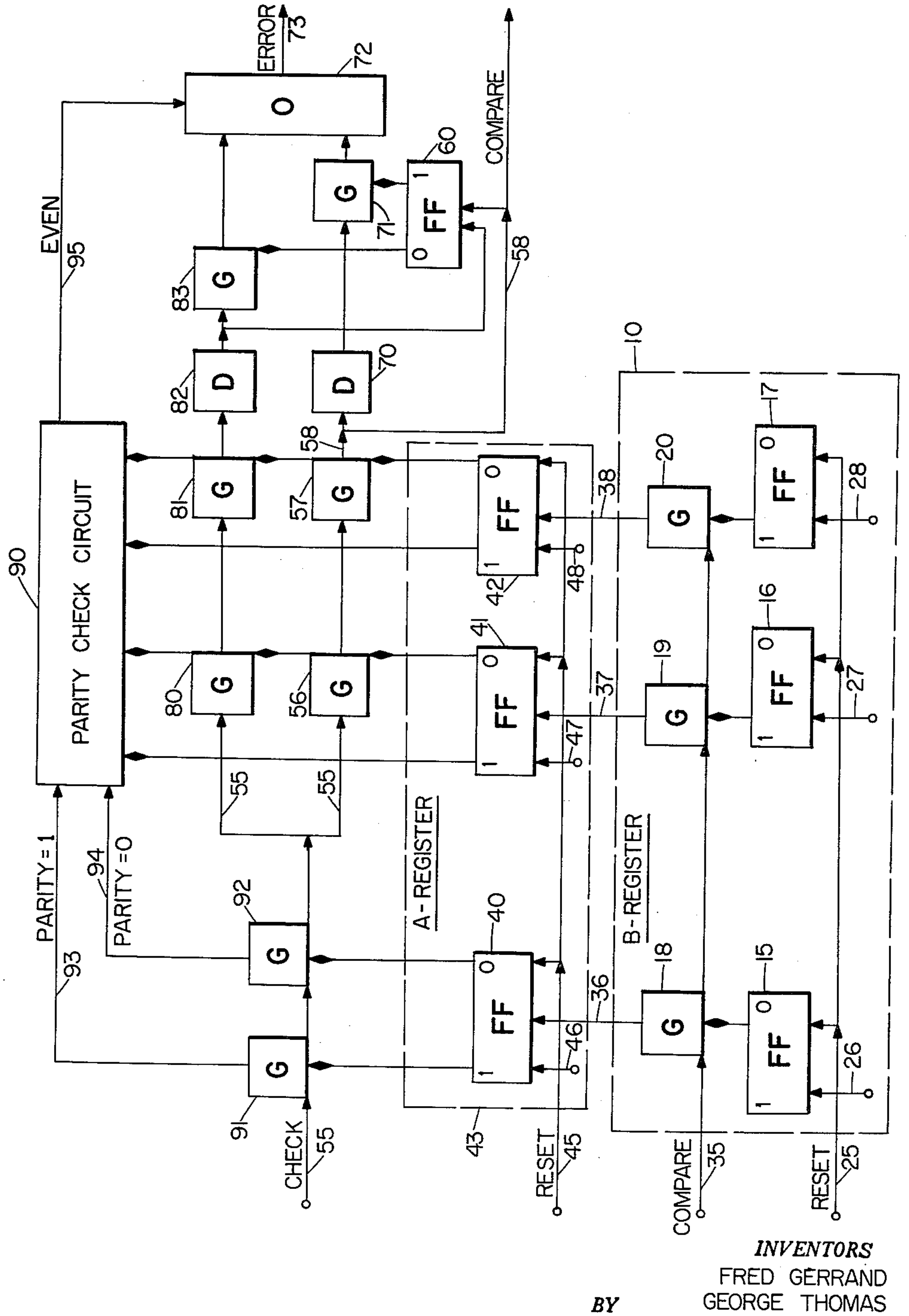
*INVENTORS*
FRED GERRAND
GEORGE THOMAS
*BY* Thomas & Crickenberger

United States Patent Office 3,111,578
Patented Nov. 19, 1963

3,111,578
UTILIZING PREDICTED PARITY
Fred Gerrand, Red Hook, and George Thomas, Kingston, N.Y., assignors to International Business Machines Corporation, New York, N.Y., a corporation of New York
Filed Dec. 31, 1959, Ser. No. 863,323
1 Claim. (Cl. 235—153)

This invention relates to a data handling device and more particularly to such a data handling device having associated error checking facilities.

An ideal type of data processing device is one which operates with one-hundred percent accuracy at all times. Data might then be processed without any errors whatever. In practice, however, the component parts of data processing equipment are unreliable to varying degrees, and to insure the accuracy of processing it becomes necessary to test the component parts periodically and repair or replace those found defective or low in performance. This leads to an increase in costs involving down time of the equipment, labor and materials. In order to alleviate some of the foregoing difficulties this invention provides a unique checking arrangement for data processing equipment which involves a minimum of component parts yet maintains a high degree of reliability in detecting malfunctions.

According to one arrangement of the invention the data processing device is in the form of a comparison circuit which compares two words to determine if the words are alike or unlike. Such a processing device is useful in many computer applications where search operations are performed. Each of the words involved in the comparison operation is associated with a parity bit which is useful in detecting various types of errors. A parity prediction circuit is provided which responds to the parity bits of the two words and generates a predicted parity bit which should correspond to the information of one of the words as modified in a given manner by the other. A parity check circuit is employed which responds to the predicted parity and the information portion of the modified word. If the predicted parity and the information portion are in agreement, no error or malfunction is presumed. If the two are in disagreement, however, then an output error signal is provided by the parity check circuit indicative of a malfunction or error. The error signal indicates an error whether the malfunction occurs in the parity prediction circuit or in the information portion of either of the two words being compared.

A sensing circuit is provided which samples the information portion of the modified word and indicates whether the two words compared are alike or unlike. If the two words are alike an output signal from the sensing circuit so indicates. Where two words are unlike an output signal is not required, and one is not present. A check circuit is provided which detects malfunctions occurring in the sensing circuit. Should a component part of the sensing circuit fail to function, the check circuit provides an output signal indicative of an error. It is possible that a malfunction may occur in the check circuit which might permit a malfunction in the sensing circuit to go undetected. It is important therefore to have a mechanism for detecting a malfunction in the checking circuit which does not involve adding further checking equipment. This is accomplished according to the present invention by using the sensing circuit to check for malfunctions in the checking circuit. Accordingly, the checking circuit checks the sensing circuit for malfunctions, and the sensing circuit checks the checking circuit for malfunctions. With an arrangement of this sort the accuracy of data processing approaches one-hundred percent.

These and other features of this invention may be more fully appreciated when considered in the light of the following specification and the single figure of the drawing which shows an illustrative embodiment according to this invention.

Referring to the drawing, a register 10 includes flip-flops 15 through 17 with associated gates 18 through 20. The register 10 is referred to hereafter as the B register, and the flip-flop 15 contains a parity bit for information bits held in the flip-flops 16 and 17. The gate 18 is associated with the Zero output side of the flip-flop 15; whereas, the gates 19 and 20 are associated with the One output side of the flip-flops 16 and 17, respectively. All of the flip-flops in the B register are set to Zero by a pulse applied to the reset line 25. Information is transferred to the B register by signals applied to input lines 26 through 28 which are associated with respective ones of the flip-flops 15 through 17. Signals on the lines 26 through 28 represent a binary One, and they cause the associated flip-flops to be set to the One state. Information is transferred from the B register by a signal applied to the compare line 35. Such a signal samples each of the gates 18 through 20 simultaneously, and each gate which is conditioned by its associated flip-flop passes a signal along respective lines 36 through 38 to the complement input of corresponding flip-flops 40 through 42 of register 43, which is hereinafter referred to as the A register. The flip-flops of the A register are reset to Zero by a signal applied to a reset line 45, and information is then transferred to these flip-flops on associated input lines 46 through 48.

It is often desirable in data processing devices to compare two words and determine if the words are alike. The A and B registers may be employed for this purpose. In order to compare two words, one of the words is placed in the B register, and the other word is placed in the A register. With two words so disposed a pulse is applied to the compare line 35 which samples each of the gates 18 through 20. Output signals from the gates 18 through 20 are applied on associated lines 36 through 38 to the complement input of respective flip-flops 40 through 42 of the A register. The flip-flops 16 and 17 of the B register contain the information bits of one word, and the flip-flops 41 and 42 of the A register contain the information bits of the other word. If the information bits of the two words are alike, each of the flip-flops in the A register which holds information (1) remains in the Zero state or (2) is changed to the Zero state. To illustrate, assume that the flip-flops 16 and 41 each holds a binary Zero. A compare pulse to the gate 19 is not passed along the output line 37 to the complement input of the flip-flop 41 because this gate is not conditioned by the One output of the flip-flop 16 since this flip-flop is in the Zero state. Accordingly, flip-flop 41 is in the Zero state before the compare operation and continues in the Zero state afterwards. To illustrate further, assume that the flip-flops 17 and 42 each contain a binary One. A compare pulse on the line 35 to the gate 20 is passed along the line 38 to the complement input of flip-flop 42 because the gate 20 is conditioned by the One output side of the flip-flop 17. The pulse on the line 38 causes the flip-flop 42 to change from the One state to the Zero state. It is seen, therefore, that when the information bits of the B register are like the information bits of the A register, a compare operation causes all the flip-flops in the A register to assume the Zero state in case they are not already in the Zero state. The compare operation therefore destroys the word stored in the A register. If it is desired to retain the information in the A register, this information may be restored by subsequently pulsing compare line 35 a second time. When this is done the flip-flops 41 and 42 will be returned to their original state assumed before the compare operation was initiated; that is, flip-flops 41 and 42 will be re-complemented to restore the original information. While the invention is described in connection with word registers containing two bits of information, it will be appreciated that any number of bits may be employed.

It is pointed out that the parity flip-flops 15 and 40 of the respective B and A registers have the gate 18 disposed therebetween so that the flip-flop 40 is complemented if, and only if, the parity bit held therein before the compare operation must be changed to agree with the correct parity of the information bits in the A register after the compare operation is completed. Whenever the parity is odd, the gate 18 must be disposed on the Zero output side of the flip-flop 18; and if the parity is even, then the gate 15 must be disposed on the One output side of the flip-flop 15. In either case, the output of the gate 18 is applied to the complement input of the flip-flop 40.

In order to demonstrate the validity of this technique, note that if two words are alike, their parity bits must be alike. If the parity bits are alike and if the word held in the A register after a compare operation holds Zeros in each position, then the parity bit for such a word must be (1) Zero where even parity is used or (2) One if odd parity is used. Odd parity is employed in the circuits of the drawing for purposes of illustration, and thus the parity bit in the flip-flop 40 of the A register must be One when all information bits in this register are Zero. As far as the parity bits are concerned, both of them must be One or both of them must be Zero whenever two words are alike. If both parity bits are One, the parity bit held in the flip-flop 40 is correct and must not be changed. In this case a compare pulse on the line 35 is not passed by the gate 18 along the line 36 to the complement input of flip-flop 40. It it seen, therefore, that the circuit performs correctly if both parity bits are One. In case both parity bits are Zero, it is necessary to change the flip-flop 40 from the Zero state to the One state. This is accomplished during a compare operation because a pulse on the compare line 35 is passed by the gate 18 since this gate is conditioned by the Zero output side of the flip-flop 15, and the pulse from the gate 18 is applied on the line 36 to the complement input of the flip-flop 40 to change it from the Zero state to the One state. It is seen, therefore, that the circuit arrangement in the drawing performs correctly for the case where both parity bits are Zero and an odd parity is used.

The foregoing illustrations demonstrate the validity of this parity generation technique for the case where two words are alike and their parity bits are alike, both parity bits being One or both parity bits being Zero. While the parity generation technique is illustrated in terms of odd parity, it may be shown in a similar manner that this technique is good for even parity. In the case of even parity the gate 18 is disposed on the One output side of the flip-flop 15.

The assumptions made thus far are that the two words being compared are alike. It is possible to have two words which are unlike. For two words which are unlike the parity arrangement may be such that the flip-flop 40 holds a parity bit of Zero when the flip-flop 15 holds a parity bit of One, or the flip-flop 40 holds a parity bit of One when the flip-flop 15 holds a parity bit of Zero. In both cases the two words supplied to the A and B registers are unlike, and the result of such a compare operation may be discarded from the standpoint of data processing. This information is used, however, for the purpose of checking the correctness of the operation of the component parts employed in the construction of the A and B registers, i.e., flip-flops and gates. The manner in which this type of check is made is explained subsequently, but in order to make such a check, it is necessary to generate the correct parity bit in the flip-flop 40 for the information bits held in the flip-flops 41 and 42 after a compare operation. The flip-flop 15, the gate 18 and the flip-flop 40 perform this function correctly for two words in the A and B register which are unlike whether the parity employed is even or odd. For the even parity case the gate 18 is disposed on the One output side of the flip-flop 15, and for the odd parity case the gate 18 is disposed on the Zero side of the flip-flop 15. Since the gate 18 is connected in the drawing for the odd parity situation, this case is now discussed.

If two words in the A and B register are unlike, the parity bits are likewise unlike. Stated another way, if the information bits of the B register include an odd number of Ones therein, then the A register must have an even number of Ones in a no compare situation where Odd parity is employed. Therefore, the even number of Ones in the information portion of the A register before a compare operation must be changed to an odd number of Ones in the information portion after the compare operation. This is because of the fact that an odd number of information bits in the A register are complemented by an odd number of bits which hold Ones in the information portion of the B register. The A register must undergo a change of its parity bit during such a compare operation since the number of Ones in the information portion changes from an even number to an odd number. This situation arises if, and only if, the B register has a parity bit of Zero and the A register has a parity bit of One before the compare operation. Thus, the parity bit of the A register is changed from Zero to One because of the compare operation. For this case a compare pulse on the line 35 is passed by the gate 18 since it is conditioned by the Zero output side of the parity flip-flop 15 in the B register, and the pulse from the gate 18 is applied on the line 36 to the complement input of the flip-flop 40 in the A register, changing it from the One state to the Zero state. It is seen, therefore, that the parity generation technique is valid for the case of a no compare situation where the parity bit of the B register is Zero and the parity bit of the A register is One before the compare operation.

An alternative case for a no compare situation is where the B register has an even number of Ones in its information portion and the A register has an odd number of Ones in its information portion before a compare operation. For the odd parity case the B register must have a parity of One and the A register must have a parity of Zero. When a compare operation takes place in this instance, an even number of bits in the information portion of the B register hold Ones which cause an even number of bits in the information portion of the A register to be complemented. Since an even number of bits in the information portion of the A register are complemented by the compare operation, it follows that the total number of Ones in the information portion of the A register is an odd number of Ones after the compare operation is completed. It is readily seen then that the parity bit of the A register is Zero before the compare operation, and it should be Zero after the compare operation is completed. Referring again to the drawing, it is seen that the parity generation circuits perform correctly for this case. A pulse on the compare line 35 to the gate 18 is not passed on the line 36 to the complement input of flip-flop 40 because the flip-flop 15 is in the One state, thereby de-conditioning the gate 18 with the Zero output side of the flip-flop 15. The flip-flop 40 is in the One state before the compare operation and continues in the One state after the compare operation because the gate 18 does not pass the compare pulse on the line 35 for the assumptions made in this case. Accordingly, it is seen that the parity generation circuits including the flip-flops 15 and 40 and the gate 18 perform correctly when two words are unlike and the B register has a parity of One and the A register has a parity of Zero.

The foregoing illustration of how a parity is generated correctly for words which are unlike assumes that both words use odd parity. If both words employ even parity, the correct parity is nevertheless generated by the flip-flops 15 and 40 and the gate 18, but the gate 18 must, in that instance, be disposed on the One output side of the flip-flop 15. The cases for an even parity situation may be proven valid by proceeding in a similar fashion to that illustrated above with respect to odd parity situations. Whether the word parity is even or odd determines whether the gate 18 is on the One or Zero output sides, respectively, of the flip-flop 15. In each instance the correct parity is generated for the word in the A register after a compare operation is completed, and the parity generated is correct for either two like words or two unlike words presented to the A and B registers before a compare operation.

Whenever two words which are alike have been compared, the A register is left with a One in the parity flip-flop 40 and with Zeros in each of the information flip-flops 41 and 42. In order to determine that the information bits in the flip-flops 41 and 42 are Zero, a check pulse is applied to a line 55. A pulse on this line is applied, among other places, to a gate 56. If the gate 56 is conditioned by the Zero side of the flip-flop 41, the pulse on the line 55 is passed by the gate 56 to a gate 57, and if this gate is conditioned by the Zero side of the flip-flop 42, the pulse is in turn passed by the gate 57 to a line 58. A pulse on this line indicates that two words compared in the A and B registers are alike. In case the two words compared in the A and B registers are not alike, no pulse is provided on the line 58. A pulse on the line 58 is applied to the One input side of a flip-flop 60 and sets this flip-flop to the One state, since flip-flop 60 was initially cleared to the Zero state. A pulse on the line 58 is applied also to a delay circuit 70 which has a minimum delay which exceeds twice the resolution time of the flip-flop 60; i.e., twice the period of time it takes the flip-flop 60 to change from one stable state to the other. A pulse from the delay circuit 70 is applied to a gate 71, and if this gate passes a pulse to an OR circuit 72, an output pulse is developed on line 73 which indicates that an error exists. The manner in which the error is signified is explained later.

A pulse on the line 55 is applied also to a gate 80. If this gate is conditioned by the Zero side of the flip-flop 41, the pulse on the line 55 is passed to a gate 81. If the flip-flop 42 is in the Zero state, the pulse applied to the gate 80 is passed to a delay circuit 82 which has a minimum period of delay that is equal to the resolution time of the flip-flop 60. A delay pulse from the delay circuit 82 is applied to a gate 83 and to the Zero input side of the flip-flop 60. If the flip-flop 60 is already in the Zero state indicating that no pulse was received on line 58 and thereby conditioning gate 83, the pulse from the delay unit 82 is passed to the OR circuit 72 and provides an error signal on the output line 73. If the flip-flop 60 is in the One state indicating that a pulse was received on line 58, then the pulse from the delay circuit 82 to the Zero input side of the flip-flop 60 causes the flip-flop to assume the Zero state. Flip-flop 60 will not be returned to the Zero state in time to condition gate 83, and no error signal will be passed through the line 73. After the pulse from the delay unit 82 returns flip-flop 60 to the Zero state, delay unit 70 will present the pulse from line 58 (delayed twice the resolution time of flip-flop 60) to gate 71. At this time gate 71 is deconditioned and the pulse will not pass through to appear as an error signal on line 73. Therefore, it will be seen that the gates 56 and 57 serve as a sense circuit to yield a compare signal on line 58 when a correct comparison has been effected and also cooperate with a checking circuit (gates 80 and 81, delay units 70 and 82, flip-flop 60 and gates 71 and 83) to yield error signals on line 73 in the event that the operation of either the sensing or checking circuitry is faulty.

An alternate arrangement of gates 56, 57, 80 and 81 may be utilized to effect more rapid operation of the sensing and checking circuits. In this arrangement gates 56 and 80 would be conditioned by the One output of flip-flop 41 and gates 57 and 81 would be conditioned by the One output of flip-flop 42. Gates 56 and 57 would be sampled in parallel by line 55 and their outputs combined in an OR circuit having an output on line 58. Similarly, gates 80 and 81 would be sampled simultaneously and fed into an OR circuit whose output would be used as the input to delay unit 82. It will be seen that this alternate arrangement would yield faster operation but require two additional OR circuits.

The One and Zero output sides of the information flip-flops 41 and 42 of the A register are coupled to a parity check circuit 90, and a check pulse on the line 55 is applied through a gate 91 or a gate 92 along respective lines 93 or 94 to the parity check circuit 90. A pulse on the line 93 indicates that the predicted parity is One, and the pulse on the line 94 indicates that the predicted parity is Zero. Predicted parity is the parity generated by the flip-flops 15 and 40 and the gate 18, earlier described. If the predicted parity on line 93 or line 94 agrees with the parity generated by the circuit 90 in response to the signals supplied thereto by the One and Zero output sides of the information flip-flops 41 and 42, then no output signal is developed on the line 95 to the OR circuit 72. Such a signal on the line 95 indicates an error, and this signal is applied to the OR circuit 72 and to the error output line 73. A signal on the line 95 indicates that the predicted parity on line 93 or line 94 is in disagreement with the word in the A register as represented by signals supplied from the One and Zero output sides of the information flip-flops 41 and 42 to the parity check circuit 90. Whenever no signal is developed on the line 95, an error signal is not developed on the output line 73 of the OR circuit 72, and this indicates agreement of the predicted parity of the word in the A register with the word actually in the A register as determined by the parity check circuit 90. The parity check circuit 90 may be any suitable one of various known types, but it preferably is one such as illustrated and described in Patent 3,011,073 granted November 28, 1961 which is assigned to the assignee of this invention. The various flip-flops, gates and OR circuits illustrated and described may be of any suitable type, but preferably are of the type shown and described in the copending application of Charles J. Tilton entitled "Asynchronous Multiplier," Serial No. 824,105, filed June 30, 1959, and assigned to the same assignee as the present invention. The delay units also may be of any suitable type, but preferably they are of the same general construction as shown in Patent 2,914,248 granted November 24, 1959, which is assigned to the same assignee as the present invention.

It is desirable in many types of data processing equipment to detect malfunctioning of any component parts. If the detection can be made as soon as there is a malfunction, this permits repairs to be made so that data processing can be performed with complete accuracy. If data processing is to be done with one-hundred percent accuracy, a checking arrangement according to this invention may be profitably employed. It is convenient at this point to point out the checking features of the device illustrated in the drawing.

In order to secure one-hundred percent accuracy of operation of the A and B registers, it is essential to detect a malfunction of any one or more components in these registers. Once a malfunction is indicated, data processing may be suspended until suitable repairs are made. A malfunction of a component in the A or B register may be detected by the parity check circuit 90. The parity check circuit 90 responds to predicted parity on one of the lines 93 or 94 and the information signals from the A register, and if the two are in agreement, no signal is generated on the output line 95 to the OR circuit 72. This signifies that no error or malfunction exists in the A or B registers which can be detected by a parity bit. It is pointed out that if a malfunction occurs in the flip-flop 15, the flip-flop 40 or the gate 18, the predicted parity may be erroneous, in which case it disagrees with the information signals supplied from the A register to the parity check circuit 90. Thus, an error signal is developed on the line 95 to the OR circuit 72 which in turn supplies this signal to the error line 73. Should the predicted parity be correct but one of the flip-flops 41 or 42 in the A register, one of the flip-flops 16 or 17 or one of the gates 19 or 20 in the B register fail to function properly, a disagreement between the predicted parity and the information signals supplied after a compare operation from the A register to the parity check circuit 90 will likewise cause a signal to be developed on the line 95 indicative of a malfunction. Accordingly, the parity check circuit 90 provides a signal on its output line 95 for a malfunction whether it occurs in the information portion of either the A or the B register or whether it occurs in that portion of the A or B register which generates the predicted parity. Consequently, a signal on the line 95 may indicate a malfunction in any one of the components of the A or B registers.

In securing one-hundred percent accuracy in data processing it is essential, when using components which do not have one-hundred percent reliability, to employ some sort of checking device for each group of components employed. It is important therefore to check the gates 56 and 57 for proper operation. To accomplish this the gates 80 and 81, the delay circuit 82, the gate 83, the delay circuit 70, the gate 71 and the flip-flop 60 are provided. If the gates 56 and 57 function properly during a compare operation when two words in the A and B registers are alike, both of these gates pass a pulse from the line 55 to the line 58 which indicates that a comparison was made of two like words. This pulse is applied to the One input side of the flip-flop 60 and sets it to the One state. This pulse is also applied to the delay circuit 70 which delays this pulse for a period equal to twice the resolution time of the flip-flop 60. During a compare operation when the pulse on the line 55 is sequencing through the gates 56 and 57 to accomplish the foregoing events, this pulse is also sequenced through the gates 80 and 81 simultaneously. At the same time that the pulse on the line 58 is applied to the delay circuit 70, the pulse from the gate 81 is applied to the delay circuit 82. The delay of circuit 82 is equal to the resolution time of the flip-flop 60 which period of delay is only one-half the period of delay of the delay circuit 70. Accordingly, the pulse on the line 58 sets the flip-flop 60 to the One state, thereby conditioning the gate 71 after the resolution time of the flip-flop 60 has elapsed. At this point in time, the pulse from the delay circuit 82 emerges and samples the gate 83. This pulse is also applied to the Zero input side of the flip-flop 60. The pulse applied to the gate 83 fails to pass through this gate because the Zero output side of the flip-flop 60 does not condition this gate during normal operation. Accordingly, the pulse from the gate 82 is blocked by the gate 83, and this pulse does not reach the OR circuit 72. One resolution time of the flip-flop 60 elapses before the flip-flop 60 changes to the Zero state. At this point in time the pulse from the delay circuit 70 emerges and samples the gate 71. Since the flip-flop 60 is now reset to the Zero state, the gate 71 blocks this pulse from reaching the OR circuit 72. Accordingly, the OR circuit 72 is not operated and no error signal appears on the output line 73. The foregoing sequence of operations occurs whenever the gates 56 and 57 perform correctly. If either one of the gates 56 and 57 fails to perform in an instance when both of these gates should pass a pulse on the line 55, then an error signal is developed on the line 73.

The manner in which this error signal on line 73 is established is now explained. A pulse from the line 55 passes through the gates 80 and 81 to the delay circuit 82 where it is delayed for one period equal to the resolution time of the flip-flop 60. A pulse should have been generated on the line 58, but such a pulse was not generated because the gate 56 or the gate 57 malfunctioned. Accordingly, the flip-flop 60 is in the Zero state and continues in this state. Subsequently, the pulse which emerges from the delay circuit 82 is applied to the Zero input side of the flip-flop 60, but since the flip-flop is already in the Zero state, it remains unchanged. The pulse from the delay circuit 82 is applied to the gate 83 which in this instance is conditioned by the Zero output side of the flip-flop 60, and the pulse is passed to the OR circuit 72 and then to the output line 73 to indicate an error.

It is desirable to be able to check for malfunctions in the gates 80 and 81 should such malfunctions occur. For this purpose the gates 56 and 57, the delay circuits 70 and 82, the gates 71 and 83, and the flip-flop 60 are employed. Let it be assumed that in a compare situation where two words in the A and B registers are alike, the gates 56 and 57 function properly to pass a pulse on the line 55 to the line 58, but one of the gates 80 or 81 malfunctions. In this instance an error signal is established on the line 73. This may be readily explained noting that in a compare situation a pulse should emerge from the gate 81 simultaneously as a pulse emerges from the gate 57. If either of the gates 80 or 81 malfunctions, no pulse is applied to the delay circuit 82, but one is applied to the delay circuit 70. The pulse applied to the delay circuit 70 is applied to the One side of the flip-flop 60 and sets it to the One state. Since there is no pulse from the delay circuit 82 to reset the flip-flop to the Zero state, when the pulse emerges from the delay circuit 70 it is passed by the gate 71 which is conditioned by the One output side of the flip-flop 60. The pulse from the gate 71 is applied to the OR circuit 72 and develops a signal on the output line 73 to indicate an error. Accordingly, it is seen that when the gates 56 and 57 function properly, the output signal from the gate 57 may be employed by the circuit arrangement shown to check for malfunctions which occur in the gates 80 or 81.

Accordingly, there is provided according to this invention a unique arrangement for comparing two registers to determine if the words held therein are alike or unlike. A unique parity prediction circuit is provided which supplies a predicted parity to a parity check circuit and information signals in the A register which should correspond to the predicted parity are likewise supplied to a parity check circuit. If the two are in disagreement an error signal is established. The circuitry for determining where the two words are alike or unlike is checked for a malfunction by a novel check circuit, and the check circuit in turn is checked by the circuit which indicates whether comparison is reached or not. The interrelationship of the circuits provides a device which is simple in construction yet provides a high degree of detection of malfunctioning components.

What is claimed is:

A device including a multistage A register and a multistage B register, means coupling the content of the B register to the A register whenever predetermined data exist in the corresponding stage of the B register, the A register and the B register each having a parity stage, means coupled between the parity stage of the B register and the parity stage of the A register for developing a predicted parity bit in the parity stage of the A register, each stage of the A register including a bistable flip-flop circuit having a zero output line and a one output line, a parity check circuit, the zero and one output lines of the flip-flops in the A register being coupled as inputs to said parity check circuit, a first gate coupled to the one output line of the parity flip-flop of the A register and a second gate coupled to the zero output line of the parity flip-flop of the A register, means coupled to said first and second gates for sampling the state of the parity flip-flop in the A register, said first and second gates having output lines coupled to said parity check circuit, a first plurality of gates coupled to the zero output lines of the flip-flops in said A register, a second plurality of gates coupled to the zero output lines of the flip-flops in said A register, said first plurality of gates being connected in tandem, said second plurality of gates being connected in tandem, the first gate in said first plurality of gates and the first gate in said second plurality of gates being energized by said means coupled to said first and second gates for sampling the state of the parity flip-flop of the A register, a separate bistable flip-flop having zero and one input lines and zero and one output lines, a third gate coupled to the zero output line of said separate flip-flop, a fourth gate coupled to the one output line of said separate flip-flop, a first delay circuit coupled between the last gate in said first plurality of gates and the zero input line of said separate flip-flop, means connecting the last gate in said second plurality of gates to the one input line of said separate flip-flop, a second delay circuit coupled between the last gate in said second plurality of gates and said fourth gate, means connecting said first delay circuit to said third gate, an OR circuit, said parity check circuit having an output line connected to said OR circuit, said third and fourth gates having output lines connected to said OR circuit, said OR circuit having an output line which is energized to indicate an error.

References Cited in the file of this patent

UNITED STATES PATENTS

| | | |
|---|---|---|
| 2,861,744 | Schmitt et al. | Nov. 25, 1958 |
| 2,871,289 | Cox | Jan. 27, 1959 |
| 2,884,625 | Kippenhan | Apr. 28, 1959 |
| 2,959,768 | White et al. | Nov. 8, 1960 |
| 3,042,304 | Hall et al. | July 3, 1962 |
| 3,046,523 | Batley | July 24, 1962 |
| 3,056,108 | Heineck | Sept. 25, 1962 |